US007385522B2

(12) United States Patent
Belden, Jr. et al.

(10) Patent No.: US 7,385,522 B2
(45) Date of Patent: Jun. 10, 2008

(54) PORTABLE ALARMING SECURITY DEVICE

(75) Inventors: Dennis D. Belden, Jr., Waxhaw, NC (US); Ronald M. Marsilio, Lake Wiley, SC (US)

(73) Assignee: InVue Security Products Inc., Charlotte, NC (US)

( * ) Notice: Subject to any disclaimer, the term of this patent is extended or adjusted under 35 U.S.C. 154(b) by 71 days.

(21) Appl. No.: 11/289,880

(22) Filed: Nov. 30, 2005

(65) Prior Publication Data

US 2006/0170549 A1 Aug. 3, 2006

Related U.S. Application Data

(60) Provisional application No. 60/644,206, filed on Jan. 14, 2005.

(51) Int. Cl.
*G08B 23/00* (2006.01)
*G08B 13/14* (2006.01)
*E05B 73/00* (2006.01)
*F16M 13/00* (2006.01)
*F16B 7/10* (2006.01)

(52) U.S. Cl. ................................ 340/693.5; 340/693.6; 340/693.9; 340/693.11; 340/693.12; 340/568.1; 340/568.2; 340/568.3; 70/18; 70/30; 70/31; 70/49; 248/551; 248/553; 403/83; 403/84

(58) Field of Classification Search ..................... None
See application file for complete search history.

(56) References Cited

U.S. PATENT DOCUMENTS 883,335 A 3/1908 O'Conner
1,238,532 A 8/1917 Lemberg
1,351,367 A 8/1920 Bowman
1,587,437 A 6/1926 Sturge
1,748,283 A 2/1930 Filby
1,765,223 A 6/1930 Ferris
2,474,157 A 6/1949 Needlman
2,591,438 A 4/1952 Kinman et al.
2,626,388 A 1/1953 Needlman
2,780,689 A 2/1957 Cavera
2,821,453 A 1/1958 Jessen (Continued)

FOREIGN PATENT DOCUMENTS

DE 3518157 11/1986

(Continued)

*Primary Examiner*—Julie Lieu
(74) *Attorney, Agent, or Firm*—Sand & Sebolt

(57) ABSTRACT

A portable security device for displaying articles of merchandise in a retail environment has a base formed with a plurality of holes arranged in predetermined patterns for mounting the device on a plurality of different support structures. A housing containing an alarm system, a retractor and an alarm cable is contained within the housing. The housing is locked on the base by a key operated tumbler attached to the base. The base is mounted on the various support structures by fasteners, the attachment heads thereof being concealed within the housing. A plunger switch at the outer end of the alarm cable is activated when the cable is attached to an item of merchandise. An audible alarm is sounded if the integrity of the alarm cable is comprised or if the item of merchandise is removed therefrom. In a modified embodiment, a space is provided between the alarm and mounting base providing increased sound alarm level in all directions.

22 Claims, 13 Drawing Sheets

U.S. PATENT DOCUMENTS 2,821,579 A 1/1958 Benjamin
2,856,517 A 10/1958 Steglich
2,912,525 A 11/1959 Ures
2,937,396 A 5/1960 Momberg et al.
3,044,631 A 7/1962 Greenman et al.
3,127,597 A 3/1964 Lewin et al.
3,216,586 A 11/1965 Sand
3,226,172 A 12/1965 Bateman
3,253,270 A 5/1966 Downer
3,316,361 A 4/1967 Thompson
3,336,892 A 8/1967 Barry et al.
3,366,944 A 1/1968 Cochran
3,426,282 A 2/1969 Brady
3,440,636 A 4/1969 Sliman
3,444,547 A 5/1969 Surek
3,596,265 A 7/1971 Garland
3,617,659 A 11/1971 Freeman
3,636,547 A 1/1972 Brace et al.
3,657,491 A 4/1972 Ryder et al.
3,668,681 A 6/1972 Kaplan
3,685,037 A 8/1972 Bennett et al.
3,705,962 A 12/1972 Banister
3,773,987 A 11/1973 Davis et al.
3,781,861 A 12/1973 Adler, Jr. et al.
3,782,654 A 1/1974 Kasa
3,786,927 A 1/1974 Manhelm
3,801,055 A 4/1974 Stenger
3,803,577 A 4/1974 Peterson, II
3,812,307 A 5/1974 Wagner et al.
3,824,540 A 7/1974 Smith, II
3,836,007 A 9/1974 Rosenwein
3,850,392 A 11/1974 Gassaway
3,858,011 A 12/1974 Salvin et al.
3,879,721 A 4/1975 Yereance
3,893,095 A 7/1975 DeJong
3,929,210 A 12/1975 Cutler et al.
3,931,949 A 1/1976 Waligorski et al.
3,932,857 A 1/1976 Way et al.
3,972,039 A 7/1976 Marshall
4,008,791 A 2/1977 Shafii-Kahany et al.
4,057,986 A 11/1977 Zolke et al.
4,066,231 A 1/1978 Bahner et al.
4,069,691 A * 1/1978 Simpson ........................ 70/59
4,069,919 A 1/1978 Fernbaugh
4,141,438 A 2/1979 Diem
4,150,371 A 4/1979 Seaglione
4,151,506 A 4/1979 Schoenmetz
4,151,521 A 4/1979 Wirth, Jr.
4,155,457 A 5/1979 Wilbert
4,211,995 A 7/1980 Smith
4,274,088 A 6/1981 Pierson et al.
4,293,852 A 10/1981 Rogers
4,316,181 A 2/1982 Primont et al.
4,332,204 A 6/1982 Hewell
4,340,884 A 7/1982 Maizland
4,384,688 A 5/1983 Smith
4,444,322 A 4/1984 Lee
4,455,464 A 6/1984 Leyden
4,472,010 A 9/1984 Parnello
4,485,278 A 11/1984 Schaller et al.
4,499,341 A 2/1985 Boyd
4,533,796 A 8/1985 Engelmore
4,546,345 A 10/1985 Naito
4,583,700 A 4/1986 Tschurbanoff
4,583,797 A 4/1986 Engelmore et al.
4,616,113 A 10/1986 Jank et al.
4,620,182 A 10/1986 Keifer
4,620,183 A 10/1986 Kottelman
4,623,765 A 11/1986 Leyden
4,633,235 A 12/1986 DeGennaro
4,646,987 A 3/1987 Peterson
4,655,352 A 4/1987 Noyes et al.
4,663,611 A 5/1987 Humphrey
4,673,228 A 6/1987 Ditzig
4,698,615 A 10/1987 Wilber
4,746,766 A 5/1988 Soulard
4,757,955 A 7/1988 Simmons
4,772,878 A 9/1988 Kane
4,819,015 A 4/1989 Bullivant et al.
4,842,108 A 6/1989 Anderson et al.
4,896,140 A 1/1990 Biever et al.
4,901,938 A 2/1990 Cantley et al.
4,989,805 A 2/1991 Burke
4,993,561 A 2/1991 Stultz
5,003,292 A 3/1991 Harding et al.
5,008,487 A 4/1991 Shimmyo
5,066,942 A 11/1991 Matsuo
5,072,213 A 12/1991 Close
5,076,079 A * 12/1991 Monoson et al. .............. 70/58
5,094,396 A 3/1992 Burke
5,103,984 A 4/1992 Leyden et al.
5,114,091 A 5/1992 Peterson et al.
5,124,685 A 6/1992 Rankin
5,146,205 A 9/1992 Keifer et al.
5,154,072 A 10/1992 Leyden
5,160,048 A 11/1992 Leyden et al.
5,172,098 A 12/1992 Leyden et al.
5,177,352 A 1/1993 Carson et al.
5,196,827 A 3/1993 Allen et al.
D335,439 S 5/1993 Leyden et al.
5,229,749 A 7/1993 Yenglin
5,230,481 A 7/1993 Wheeler et al.
5,241,297 A 8/1993 Goodman
5,246,183 A 9/1993 Leyden
5,274,353 A 12/1993 Bianchi
5,279,135 A 1/1994 Leyden et al.
5,289,559 A 2/1994 Wilson
5,331,306 A 7/1994 Carruthers, II
5,332,171 A 7/1994 Steff
5,341,124 A 8/1994 Leyden et al.
5,345,219 A * 9/1994 Rogers .................... 340/568.2
5,345,220 A 9/1994 Wachsman
5,408,212 A 4/1995 Meyers et al.
5,418,521 A 5/1995 Read
5,421,667 A 6/1995 Leyden et al.
5,462,318 A 10/1995 Cooke
5,467,075 A 11/1995 Rand
5,471,197 A 11/1995 McCurdy et al.
5,535,960 A 7/1996 Skowronski et al.
5,541,578 A 7/1996 Lussey
5,543,782 A * 8/1996 Rothbaum et al. ....... 340/568.2
5,544,836 A 8/1996 Pera
5,552,771 A 9/1996 Leyden et al.
5,561,417 A 10/1996 Rothbaum et al.
5,565,848 A 10/1996 Leyden et al.
5,570,080 A 10/1996 Inoue et al.
5,574,430 A 11/1996 Ott et al.
5,577,855 A 11/1996 Leyden et al.
5,594,419 A 1/1997 Lo
5,604,484 A 2/1997 Rogers
5,675,998 A 10/1997 Monteiro
5,676,258 A 10/1997 Leyden et al.
5,692,721 A 12/1997 Roberts
5,723,815 A 3/1998 Pena
D393,410 S 4/1998 Burke et al.
5,787,738 A 8/1998 Brandt et al.
5,796,337 A * 8/1998 Wachsman ............... 340/568.8
5,802,987 A 9/1998 Bellak et al.
5,821,857 A 10/1998 Rand
5,821,868 A 10/1998 Kuhling
5,823,358 A 10/1998 Leyden et al.
5,823,368 A 10/1998 Burke et al.
5,861,807 A 1/1999 Leyden et al.
5,886,633 A 3/1999 Adams

| | | | | |
|---|---|---|---|---|
| 5,910,768 | A | | 6/1999 | Ott |
| 5,936,525 | A | | 8/1999 | Leyden et al. |
| 5,943,966 | A | | 8/1999 | Machado et al. |
| 5,949,335 | A | | 9/1999 | Maynard |
| 5,960,651 | A | | 10/1999 | Tanisawa |
| 5,988,409 | A | | 11/1999 | Gusdorf et al. |
| 6,019,304 | A | | 2/2000 | Skowronski et al. |
| 6,027,277 | A | | 2/2000 | Leyden et al. |
| 6,037,867 | A | | 3/2000 | Joseph et al. |
| 6,039,496 | A | | 3/2000 | Bishop |
| 6,039,498 | A | | 3/2000 | Leyden et al. |
| 6,072,393 | A | | 6/2000 | Todd |
| 6,087,939 | A | * | 7/2000 | Leyden et al. ........... 340/568.2 |
| 6,095,156 | A | | 8/2000 | Smith, II |
| 6,104,289 | A | | 8/2000 | Rand |
| 6,111,505 | A | | 8/2000 | Wagener |
| 6,140,923 | A | | 10/2000 | Lam |
| 6,147,603 | A | | 11/2000 | Rand |
| 6,150,940 | A | | 11/2000 | Chapman et al. |
| 6,177,869 | B1 | | 1/2001 | McDaid |
| 6,215,400 | B1 | | 4/2001 | Rand et al. |
| 6,255,958 | B1 | | 7/2001 | Haimovich et al. |
| 6,278,365 | B1 | | 8/2001 | Kane et al. |
| 6,285,283 | B1 | | 9/2001 | Rand et al. |
| 6,300,874 | B1 | | 10/2001 | Rand |
| 6,310,550 | B1 | | 10/2001 | Wagener |
| 6,337,633 | B1 | | 1/2002 | Foseide |
| RE37,590 | E | | 3/2002 | Leyden et al. |
| 6,353,389 | B1 | | 3/2002 | Matsuo |
| 6,372,988 | B1 | | 4/2002 | Burke et al. |
| 6,375,109 | B1 | | 4/2002 | Liao |
| 6,380,855 | B1 | | 4/2002 | Ott |
| 6,386,906 | B1 | | 5/2002 | Burke |
| 6,396,401 | B1 | | 5/2002 | Matsuo |
| 6,400,269 | B1 | | 6/2002 | Savastano |
| 6,459,374 | B1 | | 10/2002 | Rand et al. |
| 6,462,668 | B1 | | 10/2002 | Foseide |
| 6,476,717 | B1 | | 11/2002 | Gross et al. |
| 6,495,756 | B1 | | 12/2002 | Burke et al. |
| 6,560,710 | B1 | | 5/2003 | Leyden et al. |
| 6,564,953 | B2 | | 5/2003 | Ascik |
| 6,570,502 | B2 | | 5/2003 | Matsuo |
| 6,571,969 | B2 | | 6/2003 | Larbaletier |
| 6,578,683 | B1 | | 6/2003 | Burke et al. |
| 6,581,421 | B2 | | 6/2003 | Chmela et al. |
| 6,626,119 | B2 | | 9/2003 | Wilton |
| 6,679,189 | B1 | | 1/2004 | Henningfeld |
| 6,698,597 | B2 | | 3/2004 | Marihugh |
| 6,700,488 | B1 | | 3/2004 | Leyden et al. |
| 6,831,560 | B2 | | 12/2004 | Gresset |
| 2003/0075603 | A1 | | 4/2003 | Rudduck |
| 2004/0150524 | A1 | | 8/2004 | Bonato |
| 2005/0161420 | A1 | | 7/2005 | Hardy et al. |

FOREIGN PATENT DOCUMENTS

| | | |
|---|---|---|
| EP | 0 063 313 | 10/1982 |
| EP | 0 516 476 | 10/1997 |
| FR | 2 549 308 | 1/1985 |

* cited by examiner

FIG-22
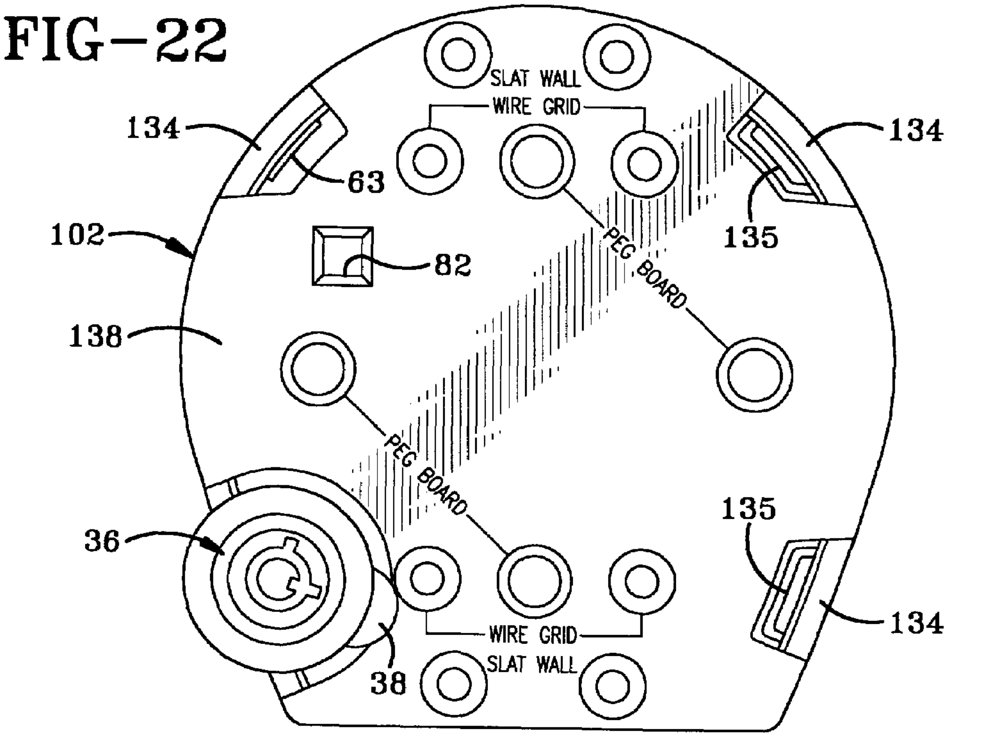
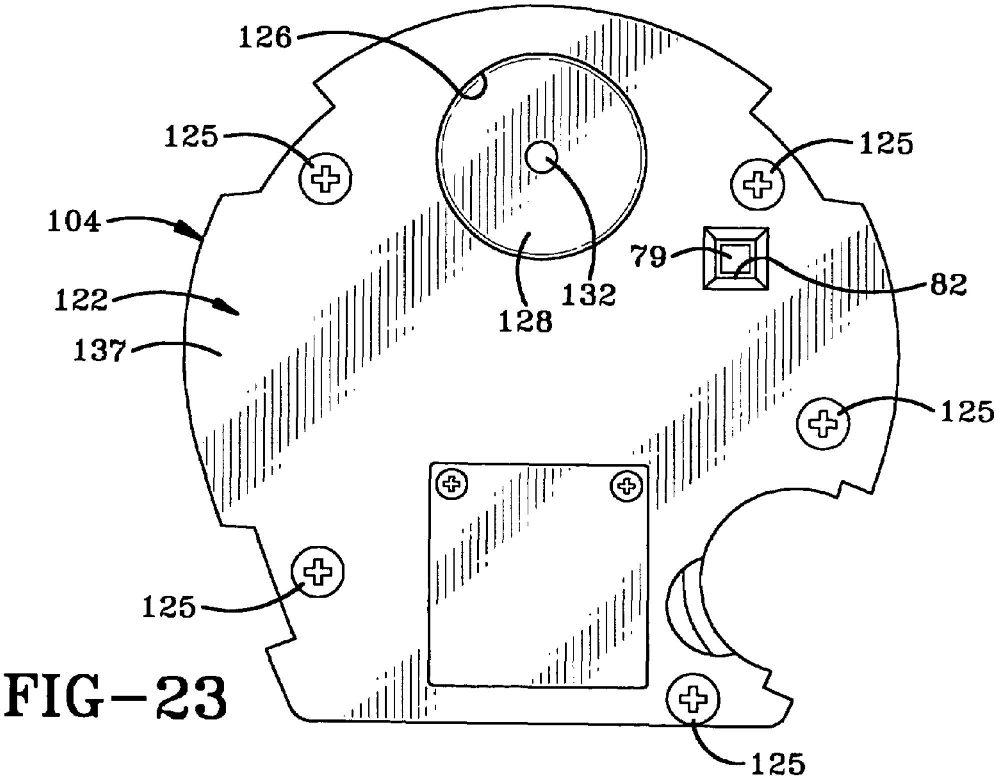
FIG-23

PORTABLE ALARMING SECURITY DEVICE

CROSS REFERENCE TO RELATED APPLICATION

This application claims priority from U.S. provisional application Ser. No. 60/644,206 filed Jan. 14, 2005; the disclosure of which is incorporated herein by reference.

BACKGROUND OF THE INVENTION

1. Technical Field

The invention relates to merchandise display systems and more particularly to merchandise display systems with an anti-theft security feature. Specifically, the display system of the present invention allows the retail merchant to display an item of merchandise which can be handled directly by a customer while preventing a shoplifter from removing the item of merchandise from the display without triggering an alarm. Even more particularly, the invention pertains to a security device which is easily adaptable for mounting on various types of support structures used to display items in a retail establishment. Furthermore, the security device enables a sound emitting alarm to be incorporated therein which provides a multidirectional increased sound level emitted thereby than possible with similar existing alarms.

2. Background Information

The owners of retail establishments continue to seek apparatus and methods for protecting various devices subject to shoplifting, such as digital cameras, portable digital systems, handheld computers, laptop computers, portable phones, etc. while not interfering with the ability of a legitimate customer to handle and test the merchandise. Merchants have found that locking such electronic devices or other items of merchandise readily subject to shoplifting in a glass cabinet decreases sales because customers feel less comfortable asking for the cabinet to be unlocked and then handling and testing the items under the security of a store employee. Merchants desire a merchandise display system that allows legitimate consumers to freely handle and test items of merchandise while preventing a shoplifter from removing the items of merchandise from the display area.

Various systems for securing items of merchandise at a display area are known in the art. One system simply tags each item of merchandise with an electronic article surveillance tag (EAS) that triggers an alarm if the item of merchandise is passed through an antenna or sensor that is typically positioned at the exits to the retail establishment. This system has drawbacks when used with various items. The first is that some shoplifters will simply grab a hand full of expensive items and quickly leave the store, triggering the alarm while making a fast getaway. Another problem is that the shoplifter can remove the EAS tag from the electronic item because it is difficult to secure an EAS tag to certain types of smaller merchandise.

Other security display systems use cables to secure the items of merchandise to the display units. The cable prevents the item from leaving the display area while providing enough movement for a legitimate customer to handle and test the item of merchandise. Some of these cable based systems use alarms that are triggered if a shoplifter cuts the cable, removes from the display unit, or removes the cable from the item of merchandise.

Another problem encountered in designing a security system for items of merchandise, which will protect the item from shoplifting yet enables the customer to readily handle and inspect the item, is that depending upon the store and location within the store that the items are displayed, various types of structures are required for attaching the displayed merchandise thereto. For example, various retail establishments use a slatted board which has spaced grooves into which various mounting clips are inserted for holding the merchandise. Another common type of display system uses pegboard in which various types of merchandise supporting rods are inserted and suspended therefrom. Still other types of display systems used by many retail establishments is a wire grid having horizontal and vertically spaced rigid wires which enables various attachments to be applied thereto for supporting the merchandise. However, these systems require the merchant to use and store a variety of attachment brackets, fasteners, etc. for attaching the security system and/or merchandise display apparatus to the various supporting structures since many retail establishments will use these multiple types of supporting structures at a single store location.

It is also desirable to provide some type of an alarm system which will alert the store personnel immediately upon a shoplifter removing the displayed merchandise from the display area or even removing the attachment and alarm system itself from the supporting structure. It is also desirable that the alarming system not require a hard wire connection to the stores electrical system and which is easily moveable between various locations in the store for displaying various items of merchandise without materially altering the alarming system.

Another problem that exists with similar security devices for protecting items of merchandise is that the sound level emitted by the internal alarm may not be as loud as desired in order to alert store personnel or customers located at a distance from the item or security device that it is being tampered with. In order to achieve a sufficiently loud alarm, it requires increasing the size of the components, namely the internal piezo alarm and/or power supply required therefore. This results in increased cost of the security device as well as a larger and bulkier device than desired. Furthermore, some types of alarm systems having an internal piezoelectric sounding alarm are susceptible to tampering and deactivation by a potential thief.

Therefore, the need exists for an improved security alarming device which is portable and readily transferable between various locations in a retail establishment, which can be easily attached to a variety of supporting structures on which the merchandise is displayed without materially altering the security device, and in which the device can be easily connected to a variety of merchandise, which if removed therefrom, will sound an alarm in a relatively simple, inexpensive and attractive device.

Likewise, the need exists for such a security device which will provide a higher emitted sound level in all directions when the alarm is actuated than believed possible with existing security devices where the alarm is secured within the interior of the security device. Also, increased security of the alarm from unauthorized tampering is desired and achieved by the security device of the present invention.

BRIEF SUMMARY OF THE INVENTION

The present invention provides an alarming display system and in particular a portable security device that allows an alarming device to be attached to a variety of supporting display structures without materially altering the device.

One aspect of the invention is to provide such a portable alarming security device which has a retractable lanyard or alarming cable which is attachable to a variety of items of merchandise, which enables the merchandise to be conveniently handled and moved by a perspective customer, yet which provides an uncluttered appearance when returned to the alarming device and display mounting by the potential customer.

Still another aspect of the invention is to provide such a portable alarming device which will sound an audible alarm should a shoplifter remove the display item of merchandise from the alarming cable or remove the alarming device itself from the attached attaching structure.

Another aspect of the invention is to provide such an alarming device which has a self-contained battery for powering the alarming system eliminating the need for the security device to be hard wired into a retail establishments electrical system.

A further aspect of the invention is to provide such a portable alarming device which includes a universal base which contains a variety of hole patterns for receiving fasteners therethrough for mounting the base to a variety of usual display support structures, such as a slatted wall, a wire grid, and pegboard, which are common merchandise display supports used by many retail establishments, and in which the attachment fastener heads are secured inside of a housing which is locked to the base by a manually actuated key/tumbler mechanism. Still further, the alarming device can be attached to a supporting structure by a pressure sensitive adhesive avoiding the use of fasteners.

Still another feature of the invention is to provide such a portable alarming security device which is of a rugged, compact structure, which is aesthetically pleasing when used in a retail environment, which is easily removed by authorized store personnel from its attachment position and reattached at various locations in the store and to various types of supporting structures, and which can be attached to various types of merchandise to be protected thereby.

Another aspect of the invention is to provide an alarming circuit in the security device which must be deactivated by a magnetic key in combination with a key actuated tumbler, to disarm the alarm system to avoid unauthorized tampering and theft even if the key actuated tumbler would be picked or opened by a thief.

Still another aspect of the invention is to provide a portable alarming security device which enables a greater multidirectional sound level to be achieved by a piezoelectric alarm module protected within the security device by providing a gap or void space between the base of the security device and a mounting plate enabling a greater portion of the piezoelectric alarm to be exposed for emitting the sound in all directions without subjecting the alarm to unauthorized tampering.

These features and aspect of the invention are obtained by the security device of the present invention which is used to display items or merchandise in a retail establishment wherein the device comprises a base adapted to be mounted to a supporting structure; a housing removably secured to the base; an alarm system mounted within the housing including a retractable alarm cable having an outer end adapted to be connected to an item of merchandise; and wherein the base is formed with a plurality of hole patterns for selectively receiving one of a plurality of attachment devices for mounting the base on a variety of supporting structures.

BRIEF DESCRIPTION OF THE SEVERAL VIEWS OF THE DRAWINGS

A preferred embodiment of the invention, illustrative of the best mode in which applicant contemplates applying the principles of the present invention, is set forth in the following description and is shown in the drawings, and is particularly and distinctly pointed out and set forth in the appended claims.

FIG. 22 is a bottom plan view of the inside surface of the mounting base for the security device of FIG. 21.

FIG. 23 is a plan view of the outside surface of the bottom closure plate for the housing of the modified security device.

Similar numerals refer to similar parts throughout the drawings.

DETAILED DESCRIPTION OF THE INVENTION

Figure 1:
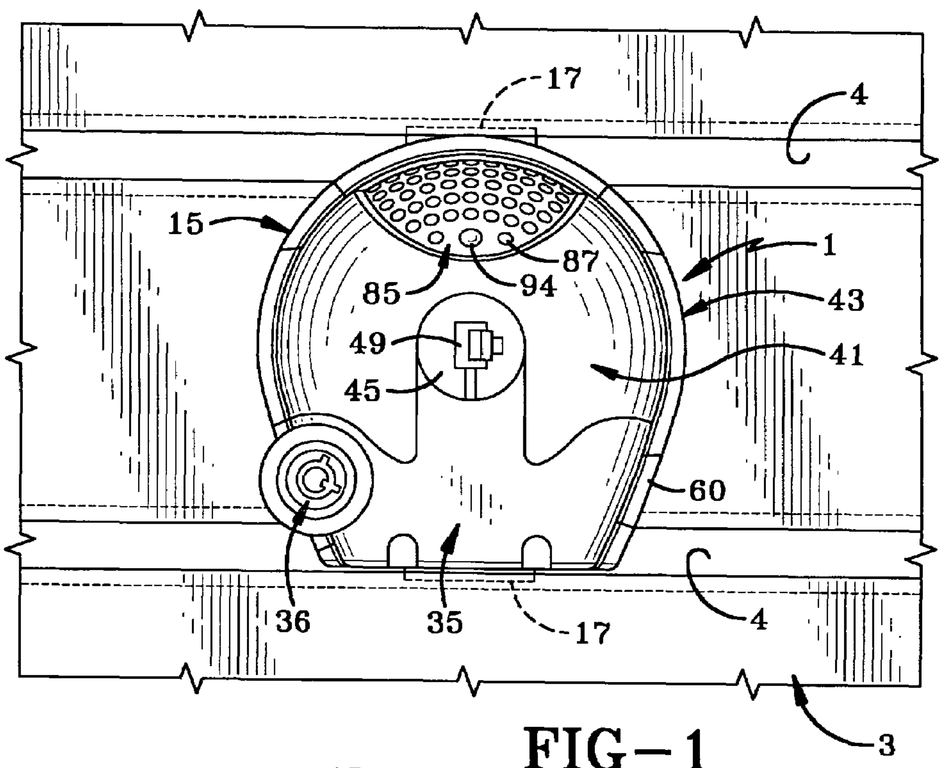
FIG. 1 is a front plan view of the portable alarming security device mounted on a slatted wall.
Figure 2:
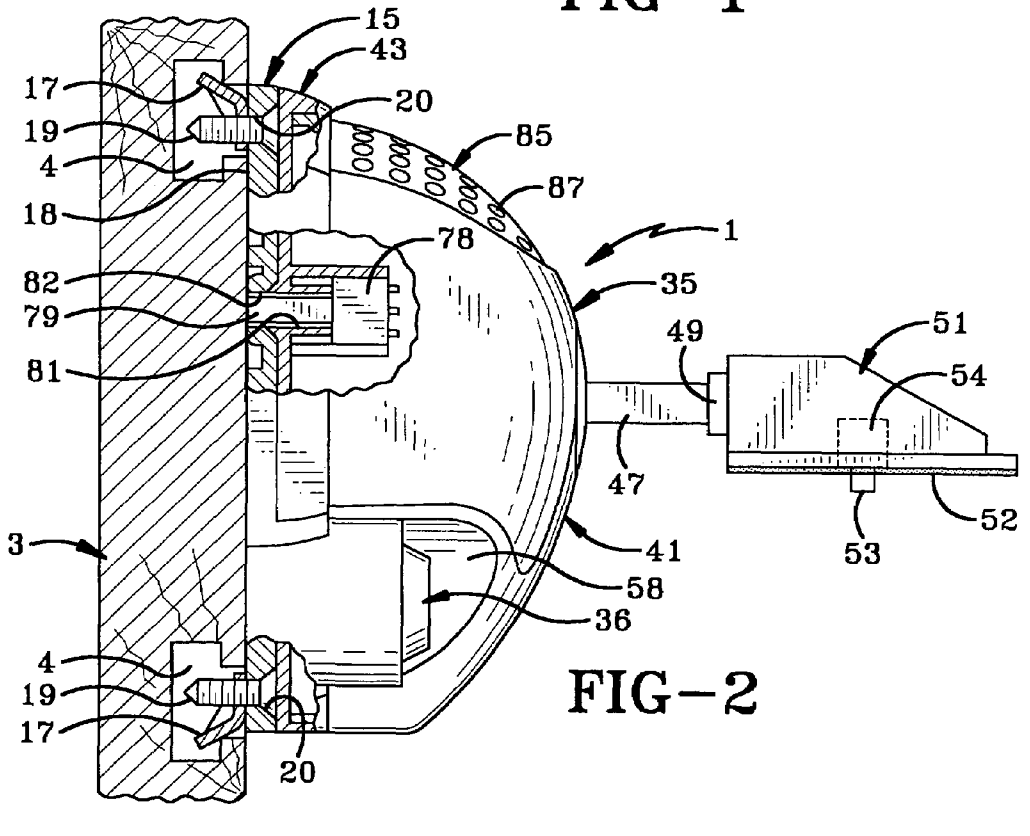
FIG. 2 is an enlarged side elevational view of the alarming device of FIG. 1 with portions broken away and in section.
Figure 3:
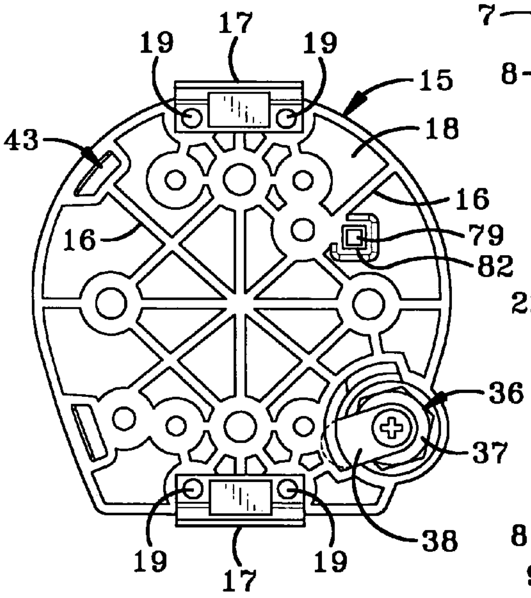
FIG. 3 is a bottom plan view of the security device removed from the slatted wall of FIG. 1.
Figure 6:
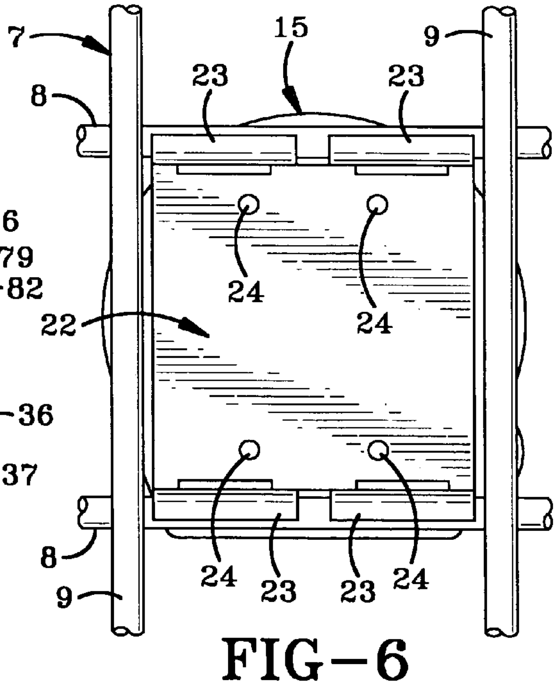
FIG. 6 is a rear plan view of FIG. 4.
Figure 4:
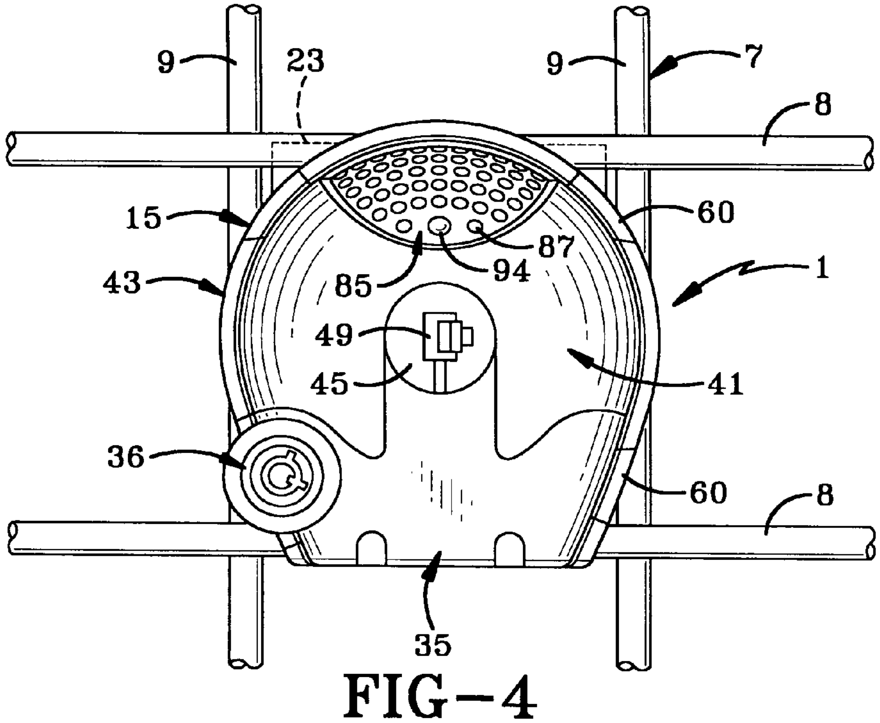
FIG. 4 is a front plan view similar to FIG. 1 showing the security device mounted on a wire grid.
Figure 5:
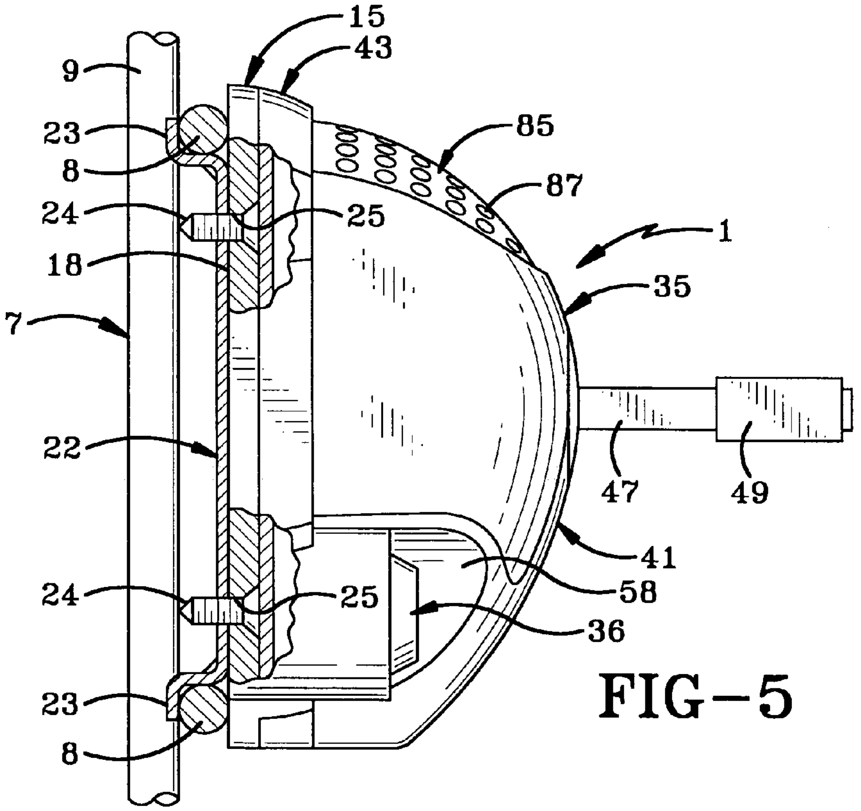
FIG. 5 is a slightly enlarged side elevational view of the security device of FIG. 4 with portions broken away and in section.
Figure 7:
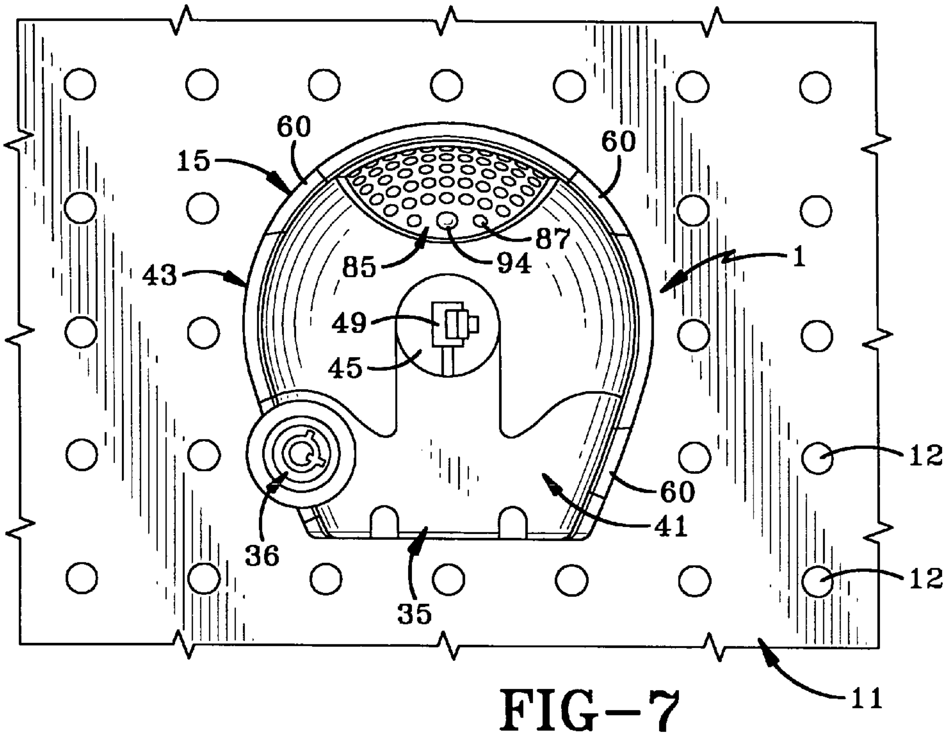
FIG. 7 is a front plan view similar to FIGS. 1 and 4 showing the security device mounted on a pegboard support structure.

A first mounting arrangement of the portable alarming security device of the present invention which is shown generally at 1, is shown in FIGS. 1, 2 and 3. Alarming device 1 is shown on one type of merchandise support which is a slatted board 3. Board 3 is formed with a plurality space parallel grooves 4 in which various types of clips are used by merchants to secure merchandise or merchandise supports thereto. FIGS. 4-6 shows alarming device 1 mounted on a wire grid indicated generally at 7, which includes a plurality of vertically spaced horizontally extending rigid wires 8, and horizontally spaced vertically extending rigid wires 9. A third mounting arrangement of portable alarming security device 1 is shown in FIGS. 7-9, wherein device 1 is mounted on a usual type of pegboard 11 formed with an array of spaced holes 12 to which various merchandise display structures are attached.

Figure 11:
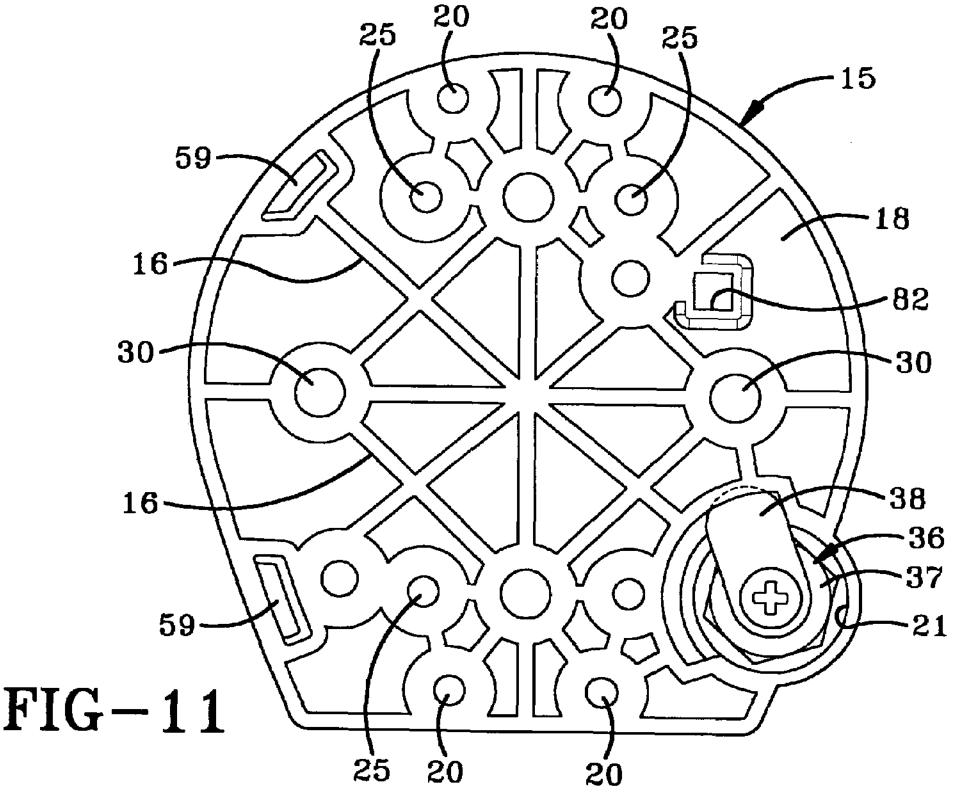
FIG. 11 is a bottom plan view of the outside surface of the mounting base shown in FIG. 10.

In accordance with one of the main features of the invention alarming device 1 is provided with a universal base 15 which is easily attachable to each of the various types of supporting structures, including support structures 3, 7 and 11 discussed above. Base 15 is a rigid one piece member formed of plastic or metal and is formed with an array of holes discussed in detail below, and may be formed with a plurality of reinforcing ribs 16 on an outside surface 18 thereof, as shown in FIG. 11. Surface 18 may also have a smooth area (not shown) for receiving a pressure sensitive adhesive pad for mounting device 1 on a surface, such as glass, without the use of fasteners.

Figure 10:
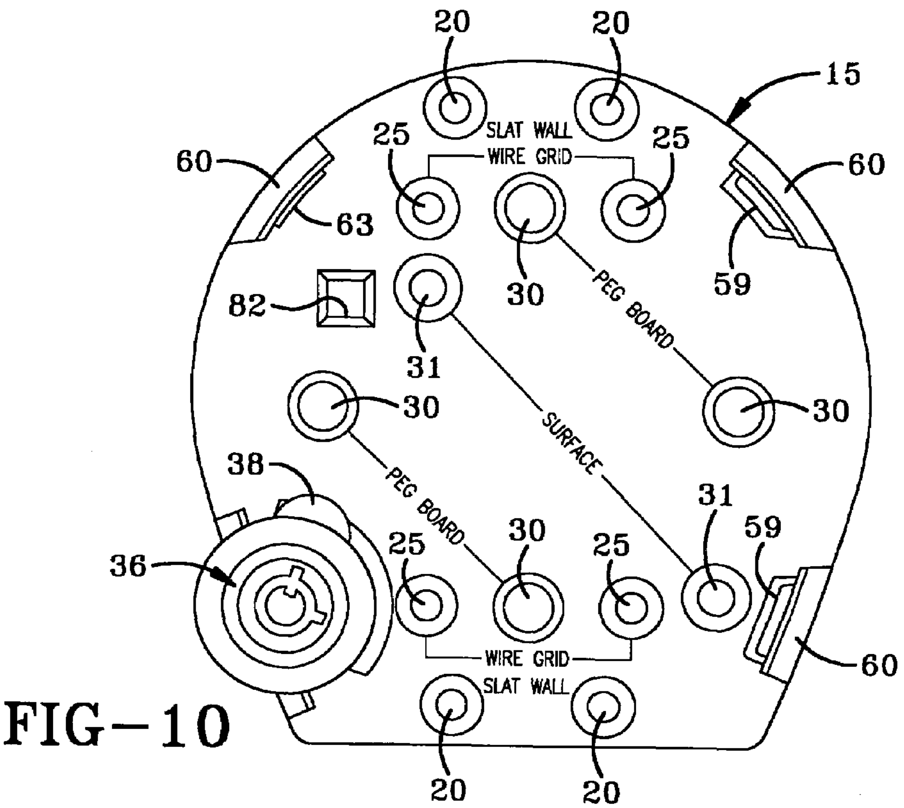
FIG. 10 is a bottom plan view of the inside surface of the mounting base for the security device of the present invention.

Base 15 is attached to slatted board 3 by a pair of angled clips 17 (FIGS. 2 and 3) which extend into grooves 4-as shown particularly in FIG. 2. The clips are mounted on bottom outer surface 18 of base 15 by a plurality of fasteners 19 which extend through two pairs of spaced holes 20 formed in base 15 as shown in FIG. 10. Universal base 15 is secured to wire grid 7 by a rectangular shaped clip 22 (FIG. 6), which terminates in right angled outwardly extending end formations 23 (FIG. 5) which extend behind a spaced pair of horizontally extending wires 8 (FIG. 4) to firmly mount clip 22 therein. Clip 22 is secured to the bottom surface 18 of base 15 by fasteners 24 (FIG. 5) which may be the same as fasteners 19 to avoid duplication of parts or other types of fasteners. Universal base 15 (FIG. 10) is formed with spaced pairs of holes 25 through which fasteners 24 extend for securing clip 22 to the bottom surface of base 15.

Figure 9:
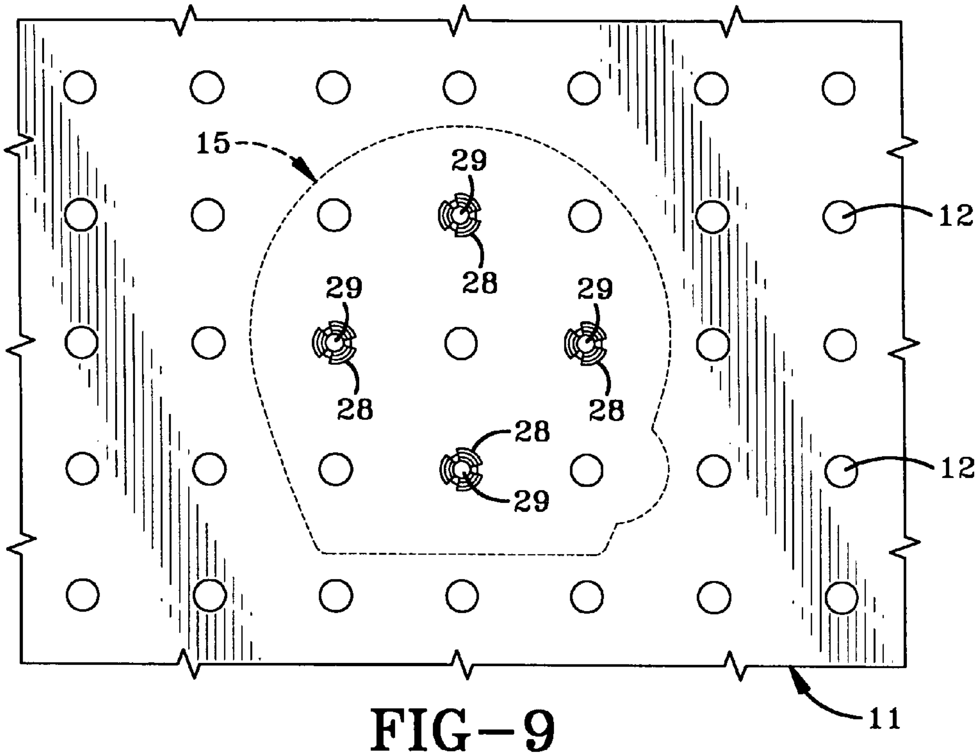
FIG. 9 is a rear plan view of FIG. 7.
Figure 8:
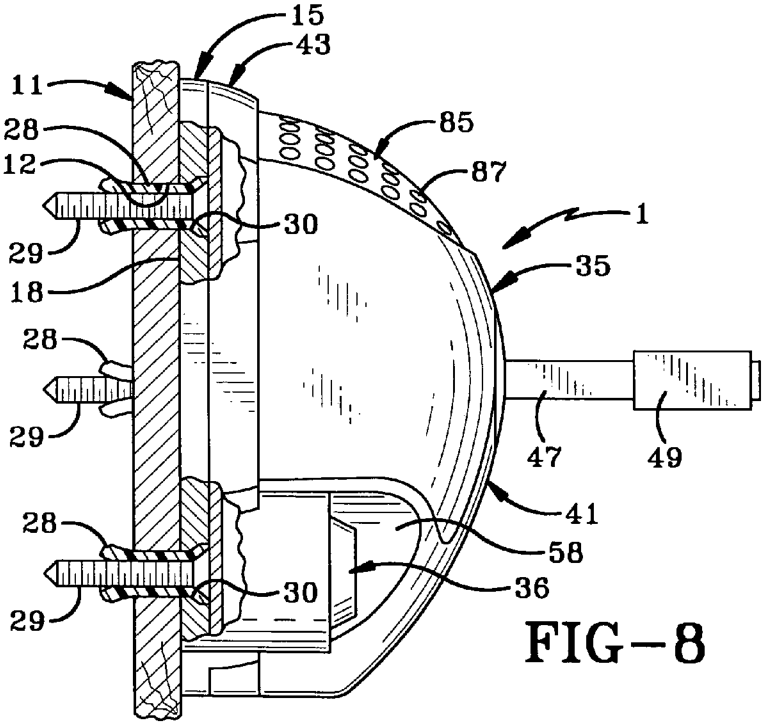
FIG. 8 is a slightly enlarged side elevational view of the security device of FIG. 7 with portions broken away and in section.

Portable alarming security device 1 is readily mounted on pegboard 11 (FIGS. 7-9) by a plurality of expansion sockets 28, two of which are shown in FIG. 8 and four of which are shown in FIG. 9, which extend through aligned holes 12 of pegboard 11 and expanded outwardly therein by complementary shaped fasteners 29 which extend through selected holes 30 formed in base 15, four of which are shown in FIG. 10. This particular arrangement of holes 30 will insure that at least two or more of the holes will align with corresponding holes 12 of pegboard 11 even though there may be some differences in the hole spacing and locations of various types of pegboards. Two spaced holes 31 also are formed in base 15 for receiving fasteners for attaching base 15 to other types of supports, such as a counter top, flat wall, etc.

Thus as discussed above, universal base 15 is easily mounted by fasteners 19, 24 and 29 through an array of mounting holes formed in base 15 enabling the base to be easily attached and secured to various types of merchandise supports used by many types of retail establishments. It is readily understood that other hole patterns can be formed in base 15 for securing the base to the support structure than those shown in FIGS. 1-9. However, the three types of support structures discussed above are commonly used in many retail establishments.

Figure 18:
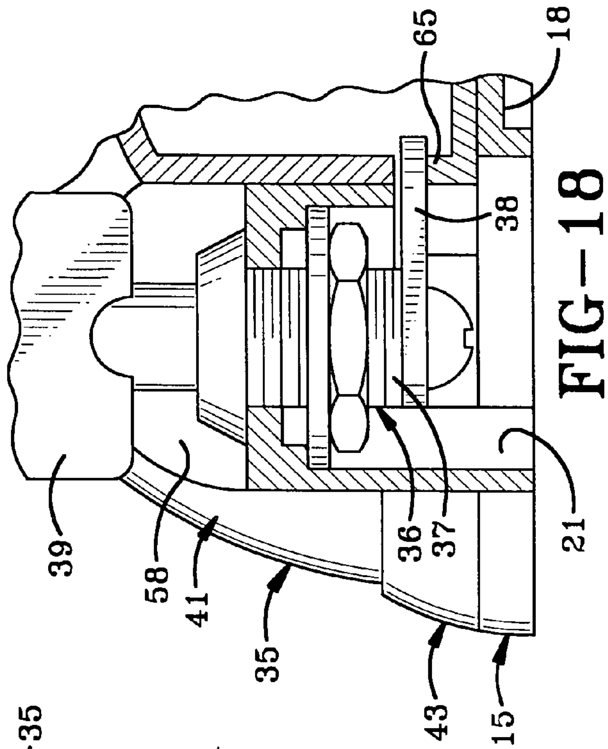
FIG. 18 is an enlarged fragmentary sectional view taken on line 18-18, FIG. 12.
Figure 12:
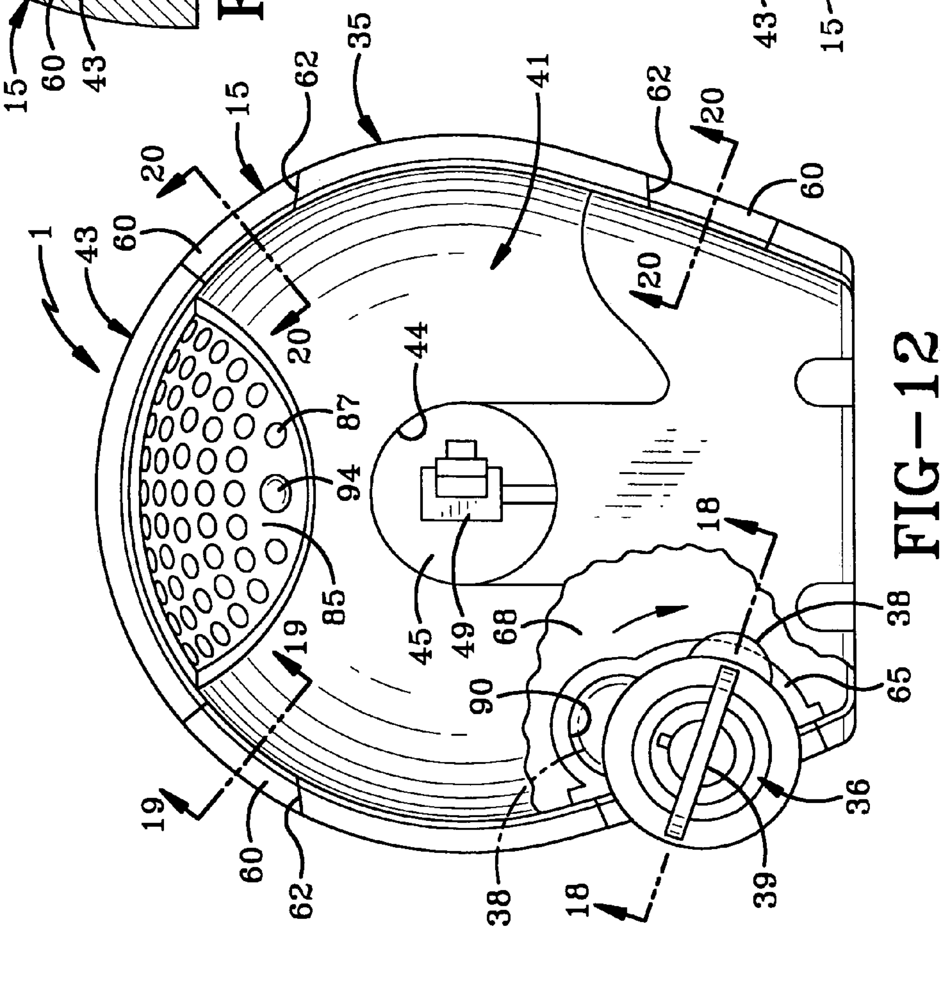
FIG. 12 is a top plan view with portions broken away of the housing mounted on the base of FIGS. 10 and 11.

In further accordance with the invention, portable alarming security device 1 includes a housing indicated generally at 35, which is removably secured by a lock mechanism 36 to base 15. Lock mechanism 36 is securely mounted in a generally circular cutout 21 of base 15, and includes a usual key operated mechanical tumbler 37 which controls the rotation of a locking lever 38 (FIGS. 3, 11 and 18). A manually operated key 39 will rotate lever 38 from a locked position as shown in full lines in FIGS. 11, 12 and 18 to an unlocked position as shown in dot dash lines in FIG. 12. The term "locked" refers to a relationship between elements that require a key to undo in contrast to a "latched" relationship between two elements which does not require a key to undo.

Figure 13:
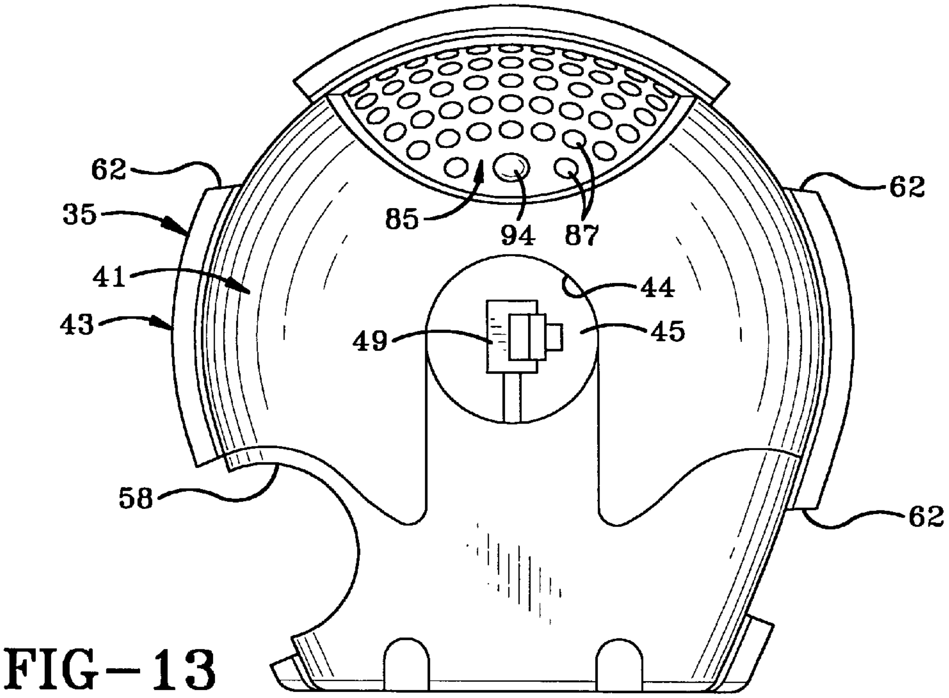
FIG. 13 is a top plan view of the housing of FIG. 12.
Figure 14:
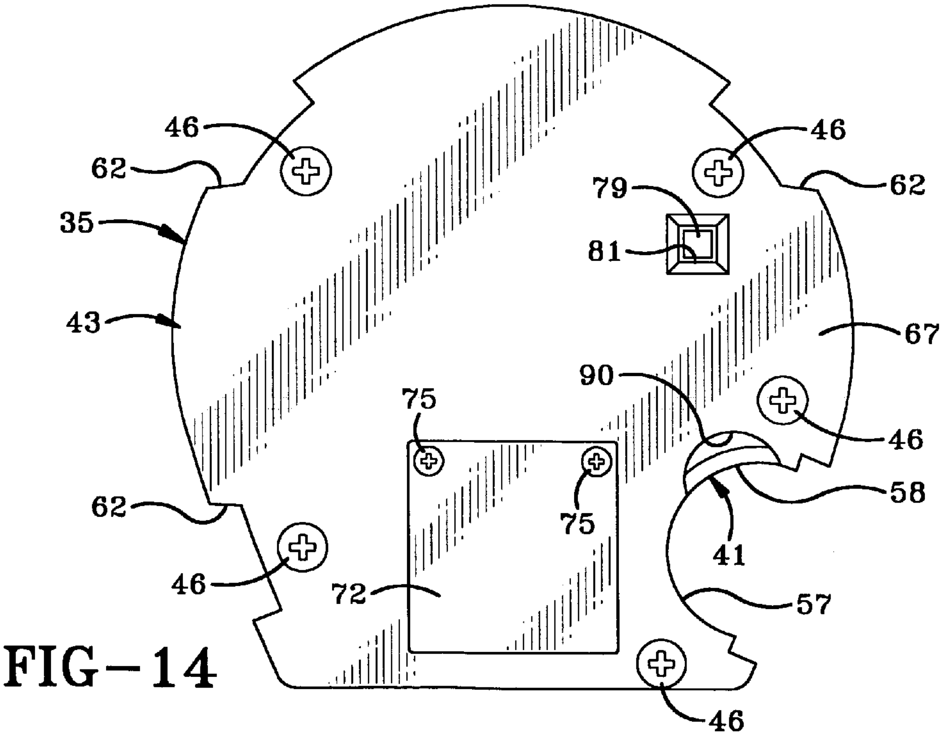
FIG. 14 is a bottom plan view of the housing.

Housing 35 includes a generally dome-shaped top portion 41 (FIG. 13) and a flat bottom closure plate 43 (FIG. 14). Housing top portion 41 includes a central circular shaped top opening 44 in which a slotted cover plate 45 is placed through which extends a retractable alarm cable 47. Alarm cable 47 can be of various constructions, such as a metal cable or a cable similar to a telephone handset conductor cable, and preferably includes one or more conductors (not shown) which extend to an end connection 49 to which may be attached to various types of devices, such as a connector pad 51 (FIG. 2). Pad 51 may have a layer of pressure sensitive adhesive 52 applied thereto for attaching an article of merchandise (not shown) to the cable. Pad 51 can be secured to cable 47 by various attachment means such as a snap-in connector 49 and can have various configurations to enable alarm cable 47 to be mechanically secured and electrically connected to an article of merchandise. Preferably a plunger 53 extends outwardly from pad 51 which is connected to a switch 54 mounted within pad 51, and electrically connected through the conductors of alarm cable 47 to an internal alarming system discussed further below. Cable 47 could also be a light pipe using light as the connecting medium instead of electrical conductors for supplying electric current to switch 54.

Figure 15:
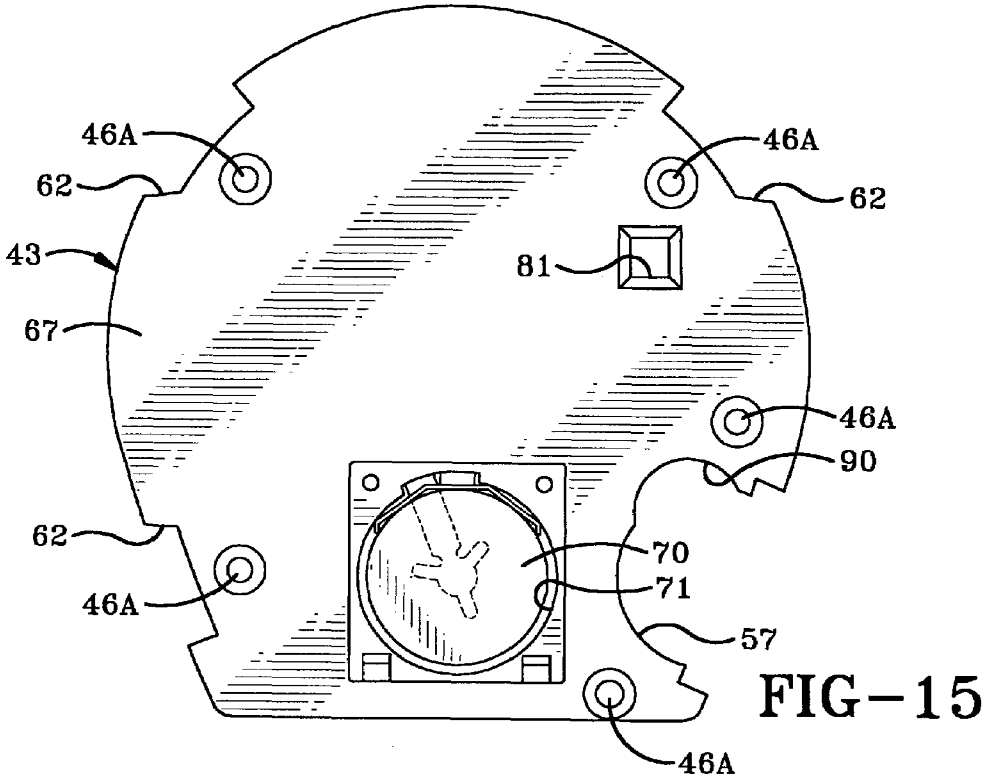
FIG. 15 is a bottom plan view of the outside surface of the housing bottom closure plate with the battery cover plate removed.
Figure 17:
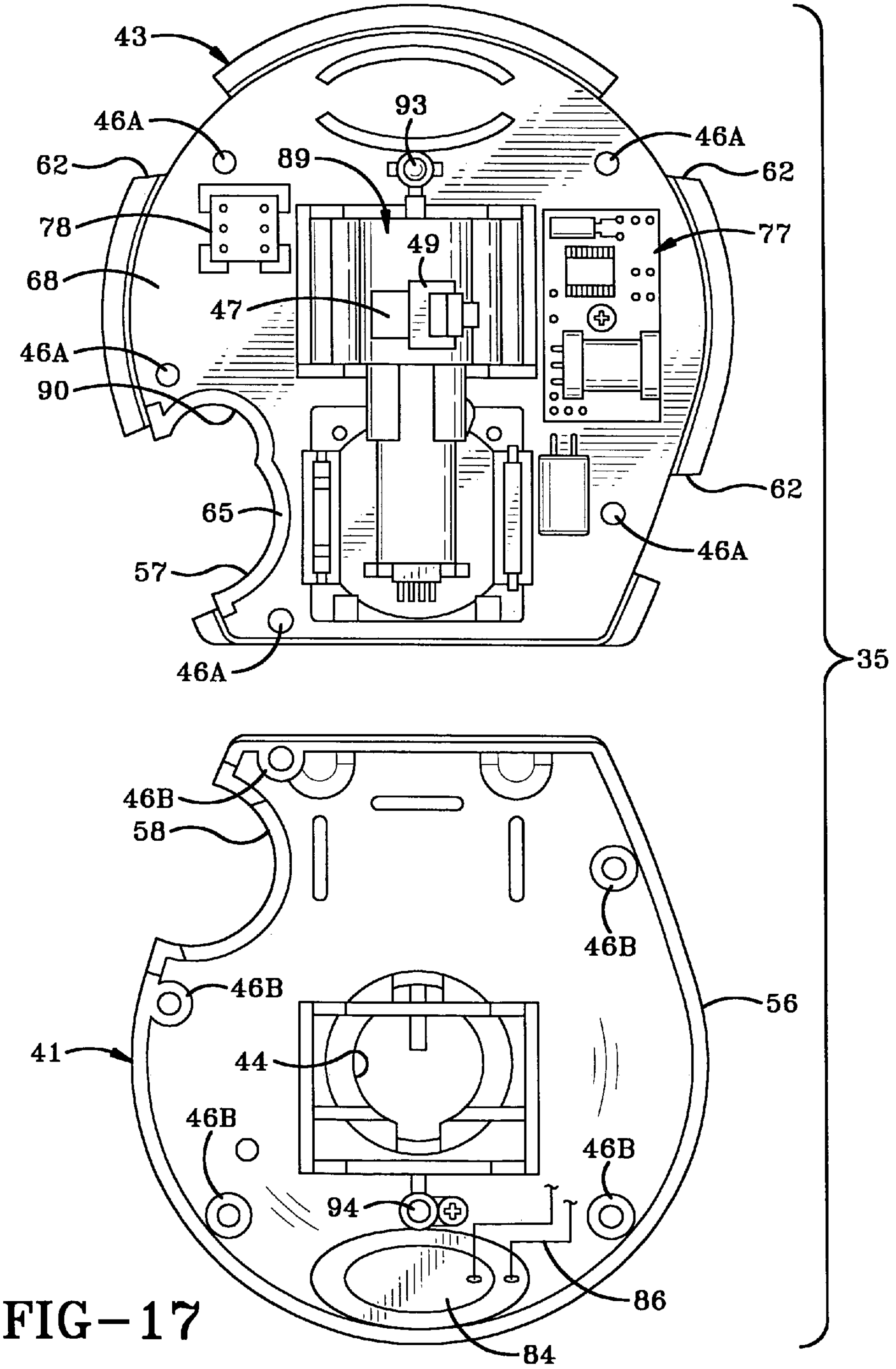
FIG. 17 is an exploded plan view of the inside surface of the top cover portion of the housing, and inside surface of the bottom closure plate removed therefrom with the various components of the alarming system mounted thereon.

Housing bottom plate 43 best illustrated in FIGS. 14, 15 and 17, has a shape generally complimentary to the bottom peripheral edge 56 of housing top portion 44 and includes a generally semicircular cutout 57 which aligns with a similarly shaped curved wall cutout 58 formed in top portion 41, through which lock mechanism 36 of base 15 extends when housing 35 is locked to base 15. Bottom plate 43 is secured to housing top portion 41 by a plurality of screws 46 (FIG. 14) which extends through holes 46A formed in plate 43 (FIG. 15) and engage bosses 46B (FIG. 17) formed on and extending inwardly from the inside surface of top portion 41. Five aligned bosses and fasteners are shown in the preferred embodiment.

Figure 19:
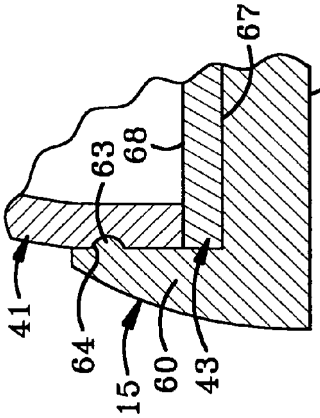
FIG. 19 is an enlarged fragmentary sectional view taken on line 19-19, FIG. 12.

Housing 35 is initially snap-fittedly mounted onto universal base 15 by a pair of arcuate projections 59 which are formed on a raised sidewall area 60 of base 15 (FIG. 20) which are located within complementary shaped cutouts 62 formed in the outer periphery of bottom plate 43 and are snap-fittedly engaged within opening 61 formed in the lower end of the housing top portion 41. Two such snap-fit engagement locations are provided with a third snap-fit engagement being formed as shown in FIG. 19 wherein a projection 63 formed on a sidewall portion of base 15 extends to a complementary shaped recess 64 formed in the lower end of housing top portion 41. These three points of attachment, together with lock mechanism lever 38 being removably engaged with the top surface of a curved rib 65 formed on bottom plate 43, rigidly attach and lock housing 35 on base 15. Thus housing 35 is partially snap-fittedly secured to base 15 and then releasably locked thereto by lever 38 of lock mechanism 36.

Figure 16:
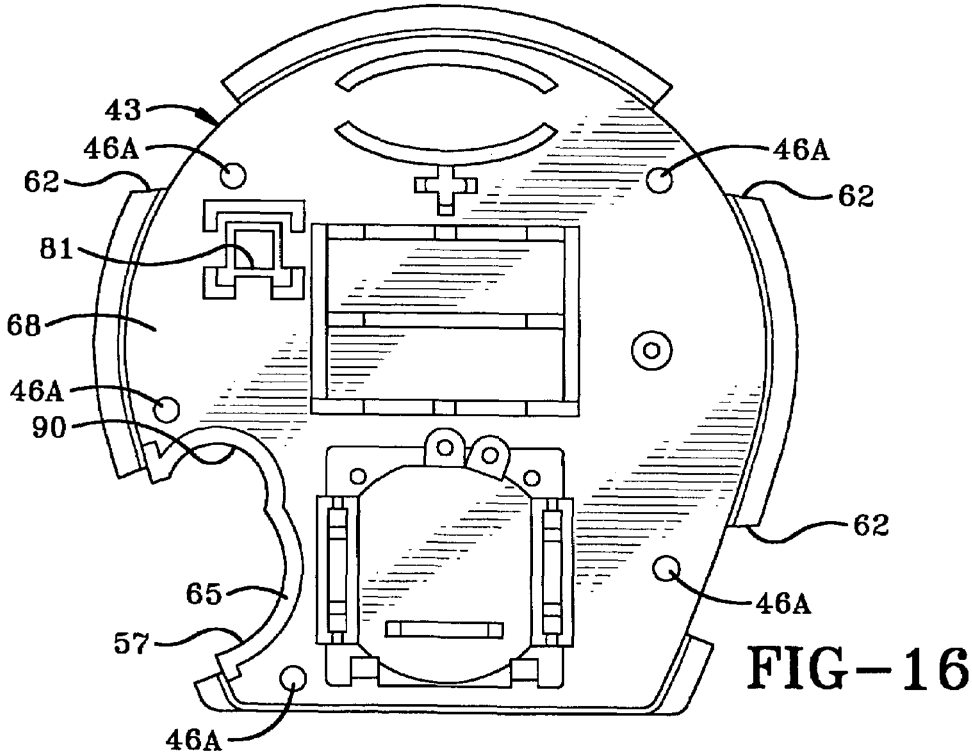
FIG. 16 is a plan view of the inside surface of the bottom closure plate of the housing.

Housing bottom plate 43 (FIGS. 14-16) has an outer surface 67 (FIG. 14) and an inner surface 68 (FIG. 16). A battery 70 is contained within a recess 71 formed in outer surface 67 and is secured therein by a cover plate 72 (FIG. 14) and a plurality of screws 75 to provide electric power to an alarm system discussed below.

An alarm circuitry indicated generally at 77, is mounted on the inside surface 68 of bottom plate 43 as shown in the upper portion of FIG. 17, and includes the required transistors, diodes, etc. of a usual type of alarm circuitry well known in the art. The alarm circuitry is connected to alarm cable 47 and to a plunger switch 78, which includes a plunger 79 (FIG. 2) that extends through aligned holes 81 and 82 formed in housing bottom wall 43 and base 15, respectively. Plunger 79 is compressed inwardly when base 15 is mounted on a supporting surface such as shown in FIG. 2, and will actuate the plunger switch 78 upon being removed from the support mechanism to actuate an audible alarm 84, which is connected to alarm circuitry 77.

Figure 24:
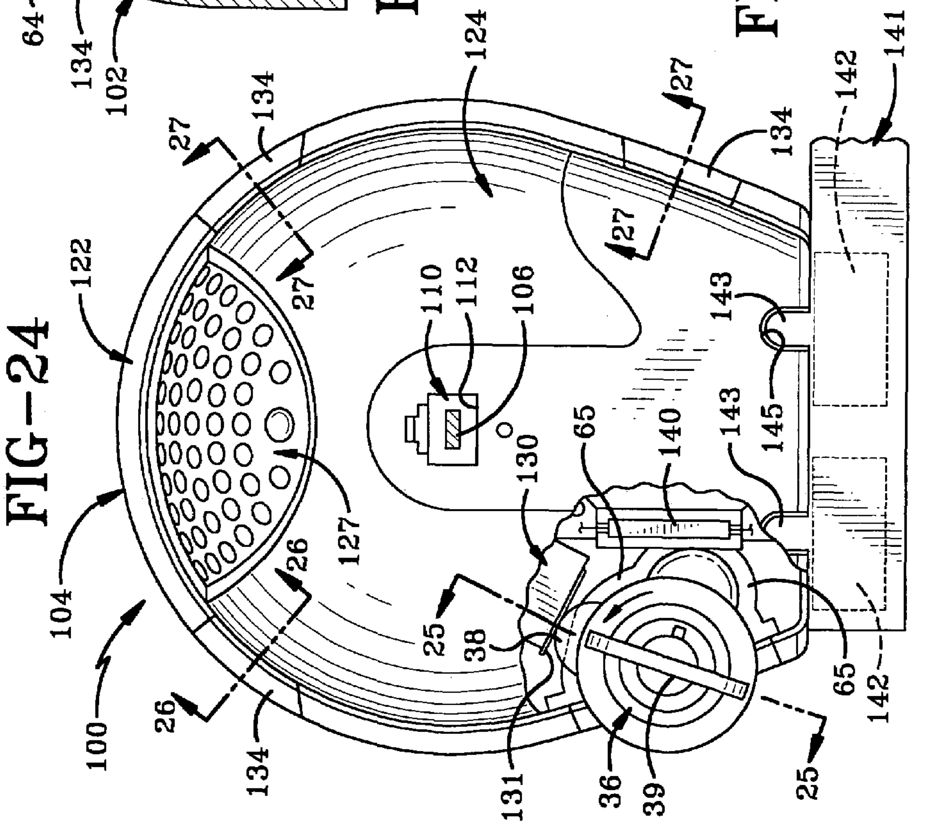
FIG. 24 is a top plan view of the modified security device similar to FIG. 21, showing the key being moved from unlocked to a locked position.
Figure 28:
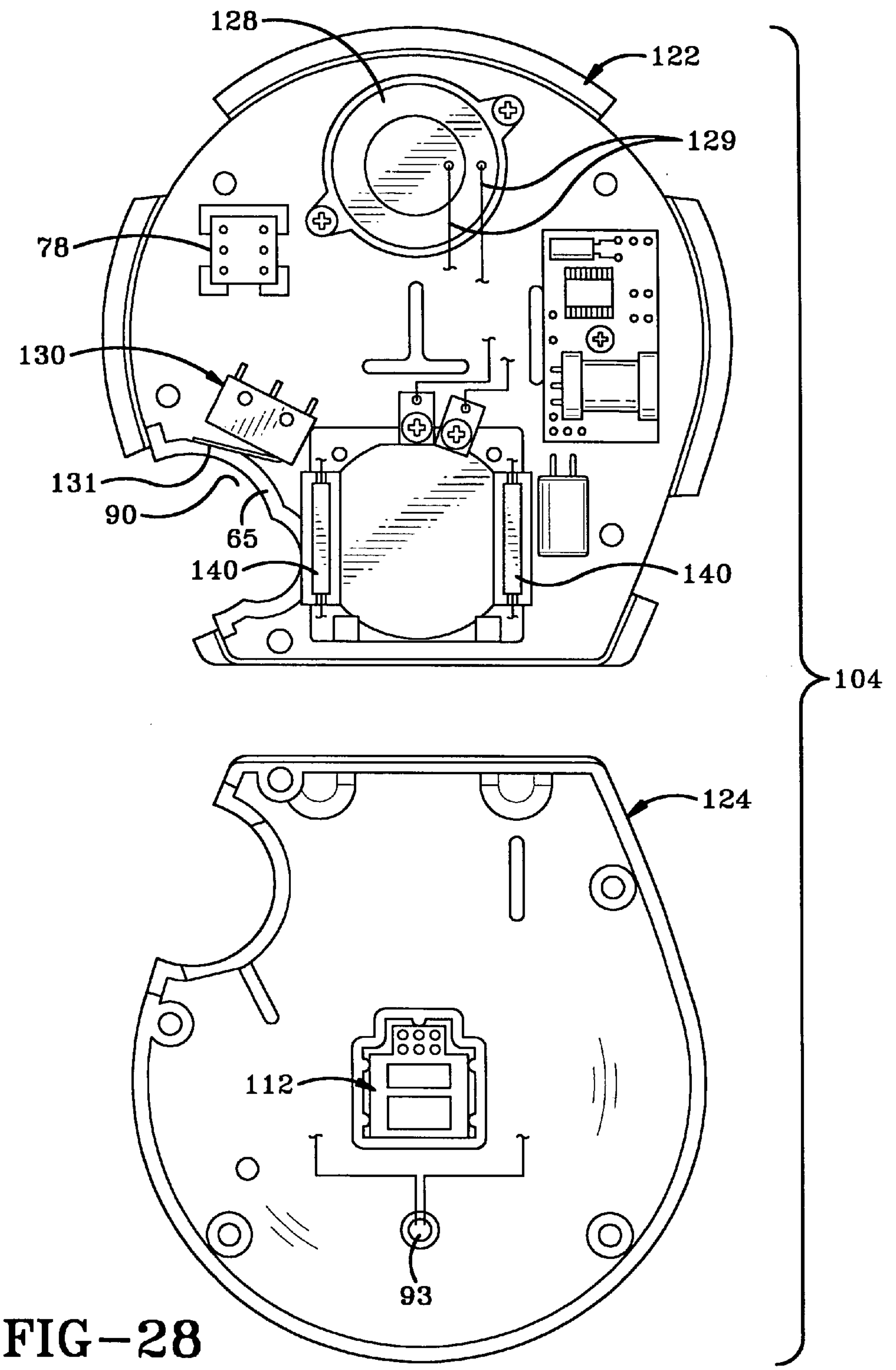
FIG. 28 is a view similar to FIG. 17 showing the inside surface of the top cover portion of the housing and inside surface of the bottom closure plate removed therefrom with the various components of the alarming system mounted therein for the security device of FIG. 21.

Audible alarm 84, which is located adjacent a grill 85 which is formed with a plurality of holes 87 in housing 35, and is connected to the alarming circuitry by conductors 86 (FIG. 17). A usual cable retractor 89 is mounted on the inside surface of bottom plate 43 for biasing alarm cable 47 into a retracted position within housing 35. The remaining details of the alarm circuitry 77 is well known in the art and thus is not discussed in further detail. However, as discussed above, alarm cable 47 will contain one or more electrical conductor which if cut or disconnected, will sound audible alarm 84. Likewise, plunger 53 extending from attachment pad 51 as shown in FIG. 2, by removal of an attached item of merchandise, will also sound alarm 84. Also base 15 if from removed the supporting structure will cause plunger 79 to actuate plunger switch 78 to sound alarm 84. The electric power required for these sensing circuits and switches are provided by the self contained battery 70 eliminating the need for the hard wiring of the alarming circuitry of security device 1 to the retail establishments electrical supply system, thereby providing portability to security device 1. A third switch 130, as shown in FIGS. 24 and 28 and discussed further below, may also be incorporated into security device 1 to provide a third alarming switch and added protection to the device, by preventing tampering with lock mechanism 36.

An LED 93 (FIG. 17) is connected to alarm circuitry 77 and shines through a lens 94 mounted in housing top portions 41 to indicate to a potential shoplifter that an alarm is activated serving as a theft deterrent.

A retail merchant can easily mount security device 1 on numerous types of supporting structures, three of which are shown in the drawings and discussed above, by securing universal base 15 to the supporting structure by the use of a pressure sensitive adhesive or fasteners such as fasteners 19 and 29, which are protected from unauthorized access upon the mounting of housing 35 on base 15 by tabs 59 and 63 followed by the subsequent engagement of lock lever 38 along and above curved rib 65 to securely mount and lock housing 35 on base 15. In this position plunger switches 54 and 78, as well as the sensing circuit through the conductors of alarm cable 47, will sound an audible alarm upon the unauthorized removal of an item of merchandise from pad 51, severing of alarm cable 47 or forceful removal of cable 47 from retractor 89, and the unauthorized removal of housing 35 from base 15 or the housing and base in combination, from the supporting structure. Housing 35 is easily removed from base 15 for reuse at another location by use of key 39 to move lever 38 from the engaged position with curved rib 65, to the enlarged opening 90 adjacent rib 65 as shown in the top portion of FIG. 17 and in FIG. 12. Once lever 38 is moved to the unlocked position, the housing can be disengaged from projections 59 and 63 for removal of housing 35 from base 15 afterwhich, the fasteners can be removed to unclamp base 15 from the selected supporting structure.

As shown in FIGS. 10 and 11, base 15 is formed with a plurality of specifically arranged holes, and in particular hole pairs, to enable the base to be easily attached by various clips 17 and 22 and expansion sockets 28, to various types of merchandise supporting structures. Thus once an item of merchandise is attached to pad 51 it can be pulled outwardly by a customer from its location closely adjacent housing 35 in order to provide full inspection thereof, and yet will return to a retracted position by retractor 89 coiling alarm cable 47 within the interior of housing 35.

In accordance with another feature of the invention, battery 70 can be replaced without removing universal base 15 from the support structure, requiring only that housing 35 be removed from base 15 which provides access directly to battery 70 by removal of battery plate 72 from the bottom of the housing as can be seen in FIG. 14. Thus, when battery replacement becomes necessary, housing 35 is merely unlocked and removed from base 15 and battery cover 72 removed by removing screws 75 for replacement of the battery.

It is also understood that alarm cable 47 need not be attached to a cable retractor 89, but could be attached directly to the electronic circuitry 77 and extend loosely from housing 35. Also if desired, an item of merchandise could be mounted directly on housing 35 and connected to electronic circuit 77 through an internal alarm cable connected thereto.

In accordance with another aspect of the invention, end connection 49 can be a phone jack-type connection easily attachable to various pads 51 for attaching to an item of merchandise. This enables various sizes and types of pads 51 or similar mechanisms be attached to connector 49 for ultimate attachment to an item of merchandise.

Figure 27:
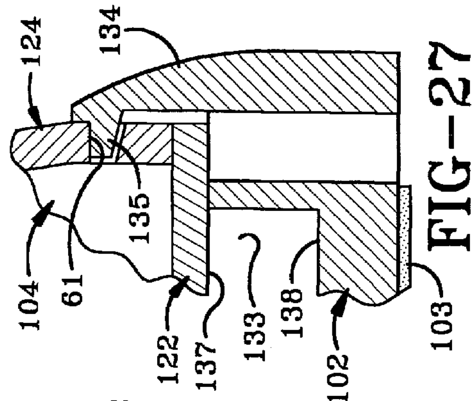
FIG. 27 is an enlarged fragmentary sectional view taken on line 27-27, FIG. 24.
Figure 26:
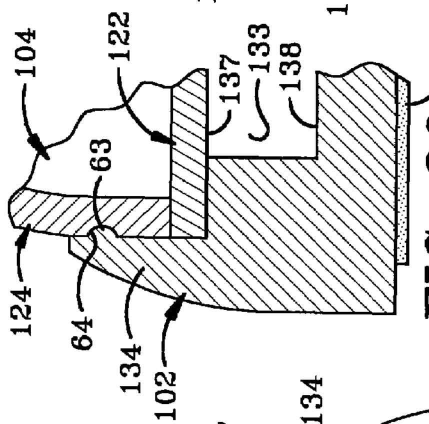
FIG. 26 is an enlarged fragmentary sectional view taken on line 26-26, FIG. 24.

A modified embodiment of the security device of the present invention is indicated generally at 100, and is shown in FIGS. 21-28. Security device 100 is similar in many respects to that of security device 1, and thus many of the common components will not be described in greater detail. Security device 100 includes a universal mounting base 102 (FIG. 22) which preferably has the same mounting hole pattern as that of security device 1 as shown in FIG. 10, and has a housing 104 lockable thereon in a spaced relationship by a similar key-operated mechanical lock mechanism 36. Mounting base 102 also can be attached without fasteners by the use of a pressure sensitive adhesive 103 as shown in FIGS. 26 and 27. Housing 104 is slightly modified from that of housing 35 in that it has a coiled lanyard alarm cable 106 connected to an internal alarm system 108, by a usual snap-in connection 110 which is received within a snap-in socket 112. Cable 106 terminates in an end connection 114 which is adapted to be secured to an item of merchandise, such as by use of an adhesive pad 116. A plunger 118 extends outwardly from end connector 114 and is electrically connected to the internal alarm system 108 and will sound an alarm if end connector 114 is forcibly removed from an article of merchandise or the cable cut or disconnected from housing socket 112 while the alarm system is activated. Cable 106 also is electrically connected to an LED 120 which can remain illuminated or in a blinking mode once the alarm system is activated to notify potential shoplifters that the item of merchandise attached to end connector 114 is protected by an alarm system to assist in deterring theft.

Figure 21:
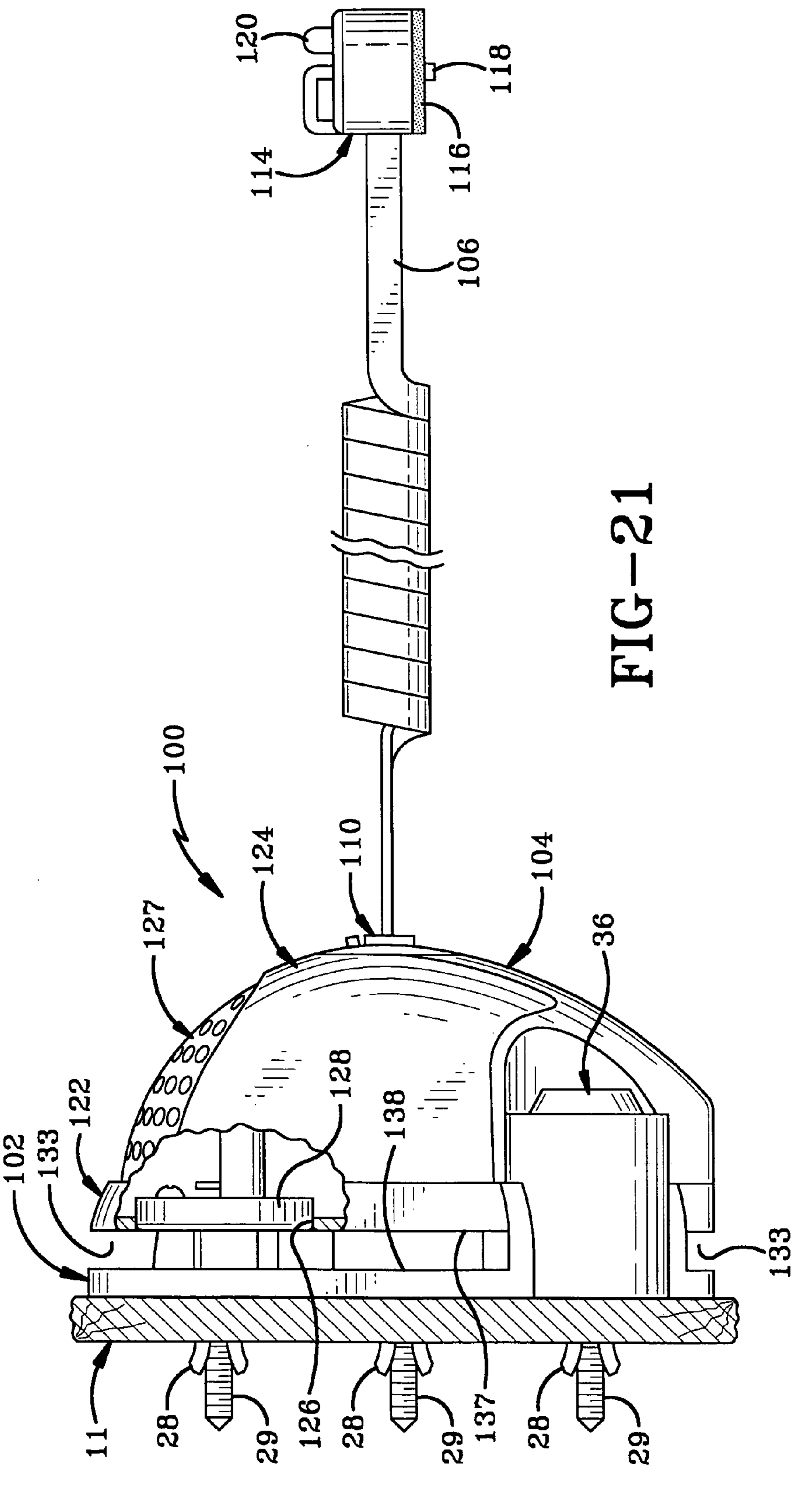
FIG. 21 is a view similar to FIG. 2 of a modified embodiment of the present invention.
Figure 25:
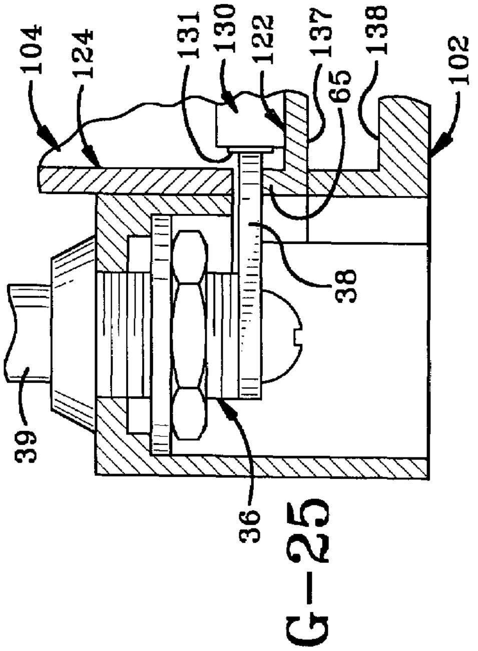
FIG. 25 is an enlarged fragmentary sectional view taken on line 25-25, FIG. 24.

Housing 104 includes a flat planar end closure bottom plate 122 (FIG. 23) which is secured to a dome-shaped top portion 124 by a plurality of screws 125. Top housing portion 124 is similar to dome-shaped top portion 41 of security device 1 except for the inclusion of snap-in socket 112 and the elimination of all holes in the simulated sound grill 127. Bottom plate 122 also is similar in most features to bottom plate 43 except for the inclusion of a circular opening 126, which in accordance with the invention receives a piezoelectric alarm 128 therein as shown in FIGS. 21, 23 and 28. Piezoelectric alarm 28 is connected to the alarm circuitry by a pair of conductors 129 (FIG. 28). Furthermore, as shown in FIGS. 24, 25 and 28, a switch 130 having a switch actuating tab 131, is mounted adjacent the enlarged opening 90 adjacent ribs 65 of housing portion 124 to be engaged by locking lever 38 as it moves from the unlocked position to the locked position as shown in FIG. 24. Thus, when in the locked position, the switch tab will be depressed activating the alarm system.

Figure 20:
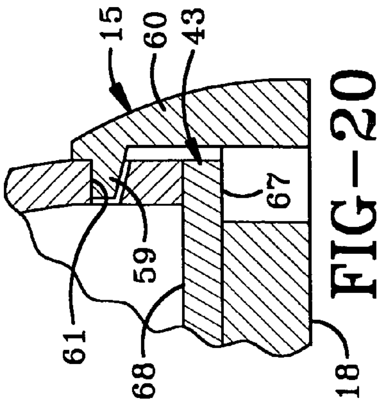
FIG. 20 is an enlarged fragmentary sectional view taken on line 20-20, FIG. 12.

In accordance with the main feature of modified security device 1, bottom closure plate 122 when attached to top housing portion 124 and locked to base 102, is spaced from base 102 as shown in FIGS. 21 and 25-27 forming a substantially unobstructed void space 133 therebetween. It has been found this unobstructed void space which acoustically communicates with the sound opening 132 of piezoelectric alarm 128, provides an increased sound level in all directions than the more directional sound emitted through holes 87 in grill 85 of security device 1. Furthermore, simulated grill 127 is free of holes which heretofore could possibly provide an opening for a thief to insert a slender object and deactivate or destroy an audio alarm adjacent thereto. This substantially unobstructed space 133 is achieved by lengthening the three raised side wall areas 134 of base 102 as shown in FIGS. 26 and 27, in comparison to the shorter side wall areas 60 of base 15 as shown in FIGS. 19 and 20. This forms void space 133 therein instead of the butting engagement of bottom plate 43 with base 15 as shown in FIGS. 19 and 20. Side wall 134 has, as in embodiment 1, the three raised side wall areas 134 which are provided with arcuate projections 135 at the upper ends thereof which are located within complementary-shaped cutouts or openings 61 of top housing 124. Again, two such snap-fit engagement locations are provided with the third snap-fit engagement being formed as shown in FIG. 26 wherein projection 63 formed on a side wall portion 136 extends into a complementary-shaped recess 64 formed in the lower end of housing top portion 124. These three points of attachment together with lock mechanism lever 38 which slidably engages the top surface of curved rib 65 formed on bottom plate 122, rigidly attach and lock housing 104 on base 102, but in the spaced relationship therewith to form void space 133. Again, space 133 is unobstructed except for the three attachments 134 and lock mechanism 36. The bottom surface 137 of bottom closure plate 122 is generally planar and extends in a generally parallel spaced relationship with the inside surface 138 of base 102.

Modified security device 100 preferably includes plunger switch 78 together with its plunger 79 which extends through opening 82 formed in base 102 for depression when mounted on a supporting structure. Since security device 1 attaches alarm cable 106 by a snap-fit connection 110, it will not need an internal retractor mechanism as used in security device 1. However, alarm cable 106 is electrically connected to the alarm system within housing 104, and thus if snap-in connector 110 is disconnected, the alarm 128 will be sounded. It has been found that by mounting alarm 28 within opening 126 of closure plate 122, the sound waves are projected directly into void space 133 through alarm opening 132 thereby considerably increasing the sound level emitted by the alarm in all directions than when the same size and type of piezoelectric alarm is mounted inside of the housing as is alarm 84 in security device 1, and the sound emitted in a more directional manner through grill holes 87. Thus, without changing the size of the alarm used within the security device, an increased sound level can be achieved in all directions by mounting it in an opening in the base of the housing and spacing the base of the housing from the supporting structure thereby reducing the absorption of the sound waves by the surrounding structures as occurs with prior alarm systems when the alarm is mounted within a housing or the housing is mounted directly to a supporting structure without an intervening open air space as that provided by space 133.

Security device 100 also has the added security of another protective switch 140 (FIGS. 24 and 28), which preferably will be one or a pair of magnetically attractable reed switches. Reed switch 140 is a normally open switch and is incorporated into the alarm circuitry along with plunger switch 78, tumbler actuated switch 130 and pad plunger switch 118. Reed switch 140 provides the additional security, that unless closed by the use of a separate magnetic key 141, will actuate alarm 128 should lock mechanism 36 be unlocked, either with or without key 39. This prevents unauthorized picking of lock mechanism 36 and requires authorized personnel to have both mechanical key 39 and magnetic key 141 to disarm the security alarm 128. Preferably, a pair of reed switches 140 will be mounted in a spaced relationship in a protective manner within housing 104, requiring magnetic key 141 to contain a pair of spaced magnets 142 to achieve proper alignment with switches 140 to deactivate the alarm system. Key 141 has a pair of positioning tabs 143 which are placed in recesses 145 found in housing 104 to properly align internal magnets 142 with reed switches 140.

Modified security device 100 also has the same advantages as discussed above as that of security device 1 as to its various mounting arrangements, ease of attachment to a supporting structure and manual locking of the housing on the support base by a key-operated lock mechanism 36. Also, piezoelectric alarm 128 is more protected within the housing since there is no perforated grill located adjacent the alarm which could provide unauthorized access and tampering of the alarm. Also, the use of a coiled lanyard as alarm cable 106 without a mechanical retractor, reduces the amount of pressure applied to adhesive 116 of connector 114, which over time could pull the adhesive away from the attached merchandise when the retractor's pressure is applied to the merchandise connector.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A security device for displaying items of merchandise in a retail environment, said device comprising:

a base adapted to be mounted to a supporting structure;

a housing removably locked to the base;

an alarm system mounted within the housing including a cable having an outer end adapted to be connected to an item of merchandise and wherein the alarm system includes an audible alarm operatively connected to a plunger switch which is actuated if the housing is removed from the base; and said base being formed with a plurality of hole patterns for selectively receiving one of a plurality of attachment devices for mounting the base on a variety of supporting structures.

2. The security device defined in claim 1 wherein a key operated tumbler is mounted on the base and includes a lever for releasable locking engagement with the housing to removably lock the housing to the base.

3. The security device defined in claim 1 in combination with a slatted wall support structure, wherein one of the attachment devices includes a plurality of angled clips and fasteners mounting the clips to the base, said clips being inserted into spaced grooves of a slatted wall for securing the base to said slatted wall.

4. The security device defined in claim 1 in combination with a wire grid support structure, wherein the attachment device includes a clip and fasteners mounting the clip to the base, said clip extending partially about a spaced pair of horizontal or vertical wires of the wire grid for securing the base to said wire grid; and wherein attachment heads of the fasteners are concealed within the housing.

5. The security device defined in claim 1 in combination with a pegboard support structure, wherein the attachment devices include a plurality of expansion sockets extending through selected holes formed in the base and aligned holes of the pegboard, and fasteners for expanding the sockets into secure engagement with the pegboard; and wherein attachment heads of the fasteners are concealed within the housing.

6. The security device defined in claim 1 wherein the base is formed with a first set of two pairs of spaced holes for receiving fasteners for securing the base to a wire grid; in which the base is formed with a second set of two pairs of spaced holes for receiving fasteners for securing the base to a slatted wall; and in which the base is formed with a third set of a plurality of spaced holes for receiving fasteners for securing the base to a pegboard.

7. The security device defined in claim 1 wherein the alarm system includes a battery and an LED which is energized when the alarm system is activated.

8. The security device defined in claim 1 wherein the cable is an alarm cable and has a switch at an outer end thereof which is activated when the cable is attached to an item of merchandise.

9. The security device defined in claim 1 wherein the plunger switch is mounted within the housing and has a plunger which extends through aligned holes formed in a bottom plate of the housing and base.

10. The security device defined in claim 1 wherein the housing includes a bottom closure plate spaced from the base forming a void space therebetween; and in which the alarm system includes a piezo alarm acoustically communicating with the void space to enhance the sound level of said alarm when actuated.

11. The security device defined in claim 10 wherein the piezo alarm is mounted in an opening formed in the bottom closure plate to acoustically communicate with the void space.

12. The security device defined in claim 10 wherein a plurality of spaced posts extend between the base and bottom closure plate of the housing and provides a snap-fit engagement for mounting the housing on said base to form the void space therebetween.

13. The security device defined in claim 1 wherein the housing includes a dome-shaped top portion and a bottom closure plate attached thereto in a spaced relationship; and in which the housing is snap-fitted to the base and locked to the base by a key operated tumbler.

14. A security device for displaying items of merchandise in a retail environment, said device comprising:

a base adapted to be mounted to a supporting structure;

a housing removably locked to the base, said housing having a bottom closure plate spaced from the base to form a void space therebetween;

an alarm system mounted within the housing including a piezo alarm acoustically communicating with the void space for enhancing the sound level of the piezo alarm when actuated;

an alarm cable having an outer end with a first switch attached thereto, said outer end adapted to be connected to an item of merchandise, and a second switch mounted within the housing and having a plunger switch which extends through the base and is adapted to engage the support structure when the housing and base is mounted thereon; and a key-operated tumbler mounted on the base and having a lever for releasable locking engagement with the housing to removably lock the housing to the base.

15. The security device defined in claim 14 wherein the base is formed with a plurality of holes for selectively receiving fasteners for securing one of a plurality of attachment devices to the base for mounting the base on a variety of supporting structures.

16. The security device defined in claim 14 wherein the alarm system includes a switch actuated by the lever of the key-operated tumbler when moving between locked and unlocked positions.

17. A security device for displaying items of merchandise in a retail environment, said device comprising:

a base adapted to be mounted to a supporting structure;

a housing removably locked to the base;

an alarm system mounted within the housing including first and second switches;

a mechanical key operated locking mechanism mounted on the base for removably locking the housing to the base, said locking mechanism activating said first switch when in a locked position; and a magnetic key for operating the second switch to permit said first switch to be deactivated when the locking mechanism moves to an unlocked position without actuating the alarm system.

18. The security device defined in claim 17 wherein the second switch is a pair of magnetically actuated reed switches; and in which a magnetic key containing a pair of spaced magnets operates said reed switches.

19. The security device defined in claim 17 wherein the second switch is a normally closed switch.

20. The security device defined in claim 17 wherein the alarm system includes an alarm cable adapted to be connected to an item of merchandise having a third switch which is activated when the cable is attached to the item of merchandise.

21. The security device defined in claim 20 wherein the alarm system includes a fourth switch having a plunger adapted to engage the supporting structure, said switch being actuated when the housing is removed from the base and when the security device is removed from the supporting structure.

22. A security device for displaying items of merchandise in a retail environment, said device comprising:

a base adapted to be mounted to a supporting structure;

a housing removably locked to the base, said housing having a bottom closure plate spaced from the base to form a void space therebetween;

an alarm system mounted within the housing including a piezo alarm acoustically communicating with the void space for enhancing the sound level of the piezo alarm when actuated, said alarm system further including an alarm cable having an outer end with a first switch attached thereto, said outer end adapted to be connected to an item of merchandise, and a second switch mounted within the housing and having a plunger switch which extends through the base for engagement with the support structure when the housing and base are mounted thereon.

* * * * *